United States Patent [19]
Lunetta

[11] Patent Number: 5,736,975
[45] Date of Patent: Apr. 7, 1998

[54] INTERACTIVE VIDEO DISPLAY

[75] Inventor: Donald M. Lunetta, Chappaqua, N.Y.

[73] Assignee: Interactive Sales System, Peekskill, N.Y.

[21] Appl. No.: 595,741

[22] Filed: Feb. 2, 1996

[51] Int. Cl.$^6$ ............................................. G09G 5/00
[52] U.S. Cl. ......................... 345/156; 345/173; 248/917; 353/122
[58] Field of Search ................ 74/471 XY; D14/128, D14/130; 235/379, 380, 381; 248/917–923; 312/7.2; 345/1, 2, 156, 157, 173; 348/13, 14, 15, 150, 744, 787, 788, 789, 836; 352/34, 104; 353/74, 77, 119, 122; 359/449, 453, 460; 361/681; 364/479.01, 479.04, 514 R; 434/324

[56] References Cited

U.S. PATENT DOCUMENTS

| | | | |
|---|---|---|---|
| D. 377,170 | 1/1997 | Wilson | D14/130 |
| 3,582,199 | 6/1971 | Barr | 352/104 |
| 3,774,316 | 11/1973 | Meier | 434/324 |
| 4,720,849 | 1/1988 | Tayama | 345/1 |
| 4,953,971 | 9/1990 | Highfill | 353/122 |
| 5,271,669 | 12/1993 | Pearlson | 312/7.2 |
| 5,283,819 | 2/1994 | Glick et al. | 348/14 |
| 5,300,943 | 4/1994 | Jakobs et al. | 345/173 |
| 5,369,258 | 11/1994 | Sansone et al. | 235/381 |
| 5,412,189 | 5/1995 | Cragun | 235/380 |
| 5,521,659 | 5/1996 | Arnott | 353/119 |
| 5,568,279 | 10/1996 | Hinman et al. | 345/2 |
| 5,580,146 | 12/1996 | Maslow | 353/74 |
| 5,594,661 | 1/1997 | Bruner et al. | 364/514 R |

*Primary Examiner*—Steven Saras
*Attorney, Agent, or Firm*—St. Onge Steward Johnston & Reens LLC

[57] ABSTRACT

An interactive display is described wherein a rear projection screen is mounted above a base housing. Inside the housing is a touch position sensor to which a pedestal is mounted and extends through an opening in the housing to support the rear projection screen at a comfortable level. The touch position sensor produces touch signals indicative of where a person touched the rear projection screen. A projector responsive to video signals from a program storage device controlled by the touch signals is mounted inside the base housing and generates an optical beam which is directed via a reflector onto the rear of the projection screen.

7 Claims, 4 Drawing Sheets

INTERACTIVE VIDEO DISPLAY

FIELD OF THE INVENTION

This invention relates to an interactive display.

BACKGROUND OF THE INVENTION

In a copending U.S. patent application entitled Interactive Display System Using A Laser Disk Player by D. M. Lunetta and assigned to the same assignee as for this application and filed in the United States Patent Office on Dec. 8, 1994 bearing Ser. No. 08/351,685, an interactive display is described. The system utilizes a standard TV monitor placed on a touch position sensor. A control operates with the output touch signals from the touch position sensor to produce frame signals representative of the video frames recorded on a laser disk. This application and any patent as may issue therefrom is incorporated herein by reference thereto.

Other interactive display devices can be found described in U.S. Pat. Nos. 4,644,401; 5,226,160; 5,231,381; 5,235,509; and 5,250,929.

Although the interactive display system described in the copending patent application is particularly effective, there is a need for providing a simplified display which is suitable for placement at an easily accessible area and used in a convenient manner.

SUMMARY OF THE INVENTION

With an interactive display in accordance with the invention a compact structure is provided with which a focus on the display enables a person to make use of the interaction in a productive manner. This is achieved in accordance with one form of the invention by providing a base housing which encloses a touch position sensor. A pedestal is mounted on the touch position sensor to extend upwards from the base housing and support a rear projection screen. The screen in turn extends over the base housing so as to intercept the optical beam from a projector mounted inside the base housing. A video play back device is provided and responds to the touch position signals to generate video frame signals for display. These signals are converted by the projector to an optical beam for rear projection on the screen.

With the projector oriented horizontally the beam is reflected by an adjustable mirror to the rear surface of the screen. The display then shows different menus at different positions in the manner as described in the copending patent application. When a person then touches the display, touch signals, representative of the menu displayed at the touched area, are produced to cause an optical display of a film or such other information as called for by the touched menu location.

With a display in accordance with the invention a sort of magical display of motion is obtained from a seemingly invisible source to produce a display that is effective as an advertising or promotion tool.

It is, therefore, an object of the invention to provide an interactive display with which still or motion pictures can be displayed in an effective manner. It is a further object of the invention to provide an interactive display which is convenient to use and adapt to different displays.

These and other objects and advantages of the invention can be understood from the following description of a preferred embodiment as shown in the drawings.

DETAILED DESCRIPTION OF THE DRAWINGS

Figure 1:
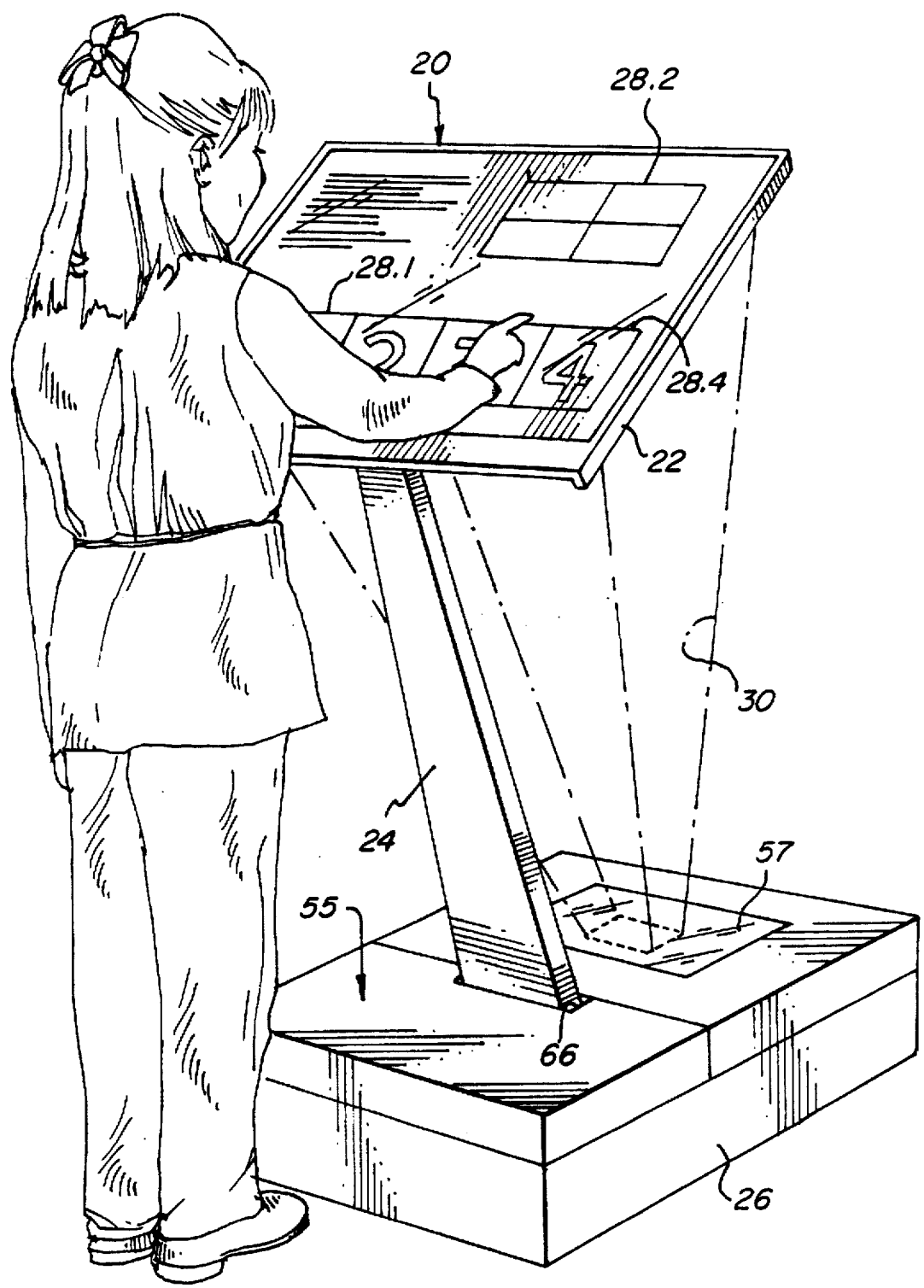
FIG. 1 is a perspective view of an interactive display in accordance with the invention.

With reference to FIG. 1 an interactive display 20 is shown formed of a translucent rear projection screen 22 mounted on a pedestal 24 emerging from inside a base housing 26. The screen 22 is inclined relative to the horizontal so as to make it convenient to engage particular touch areas 28.1–28.4 produced by an optical beam 30. The beam 30 emerges from inside the base housing 26 and is incident on a rear surface 32, see FIG. 3, of the screen to produce the visible touch areas 28.

Figure 2:
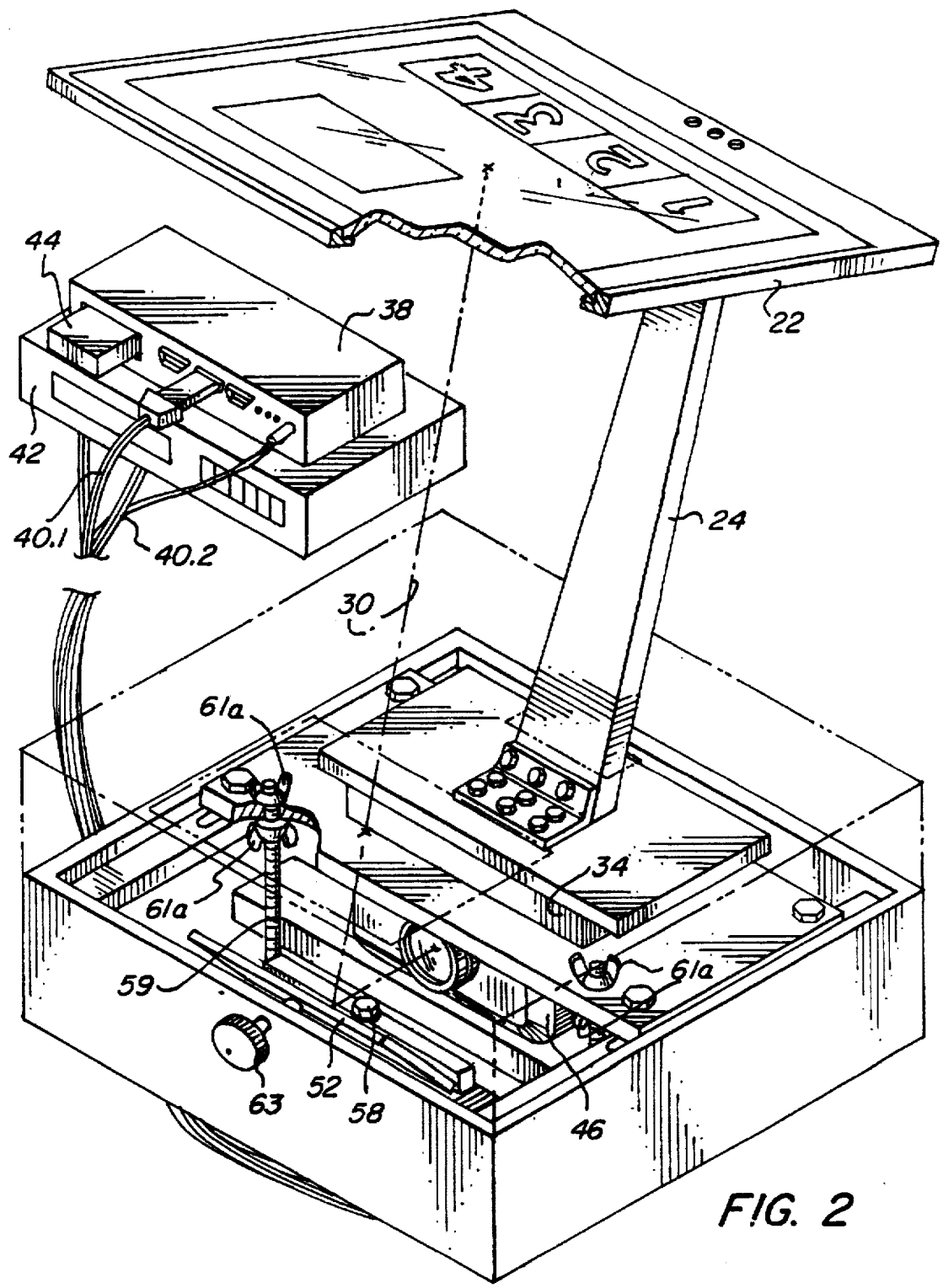
FIG. 2 is a perspective broken away view of the interactive display and associated controls in accordance with the invention.
Figure 3:
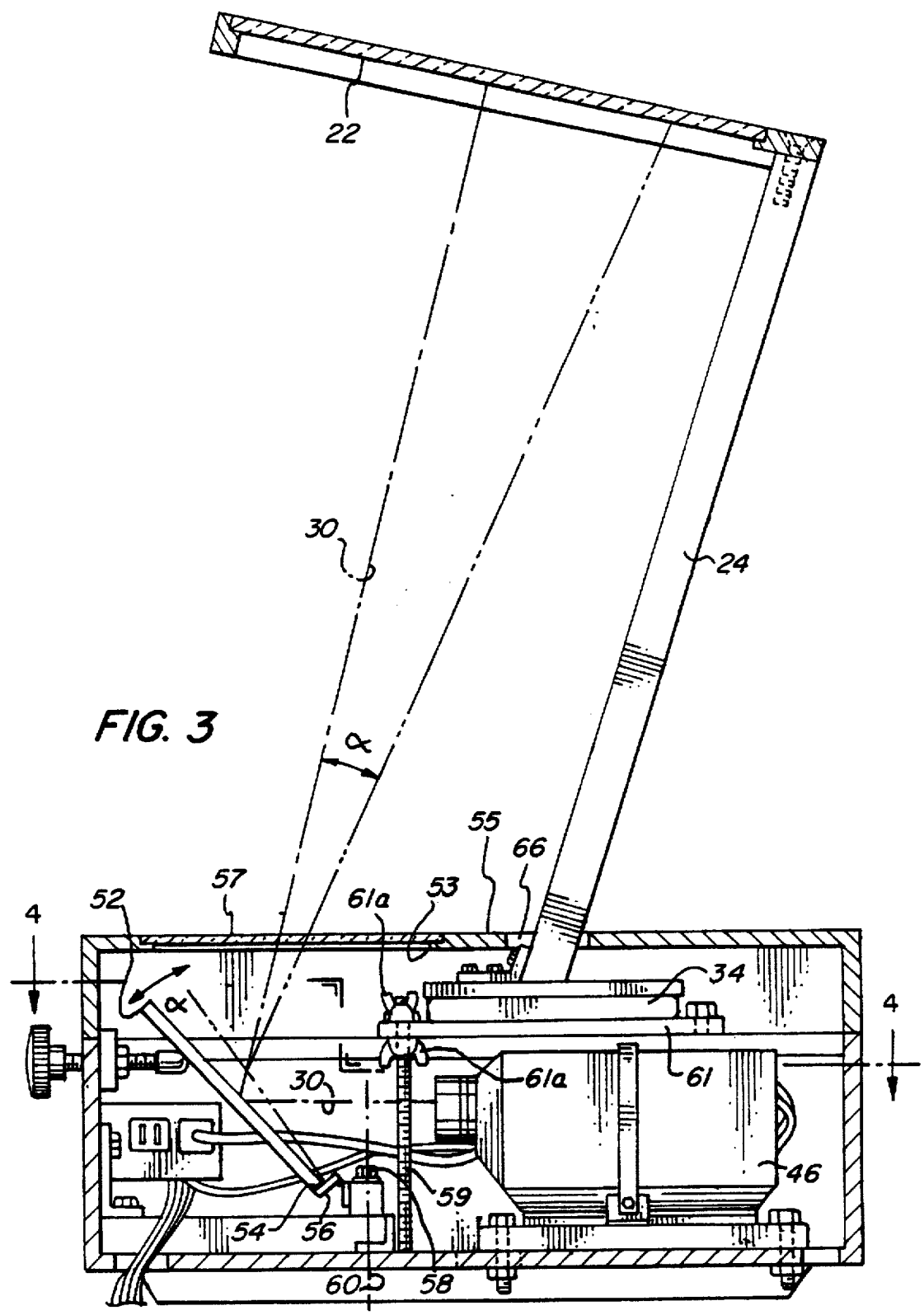
FIG. 3 is a side sectional view of the interactive display of FIG. 2 in accordance with the invention.
Figure 4:
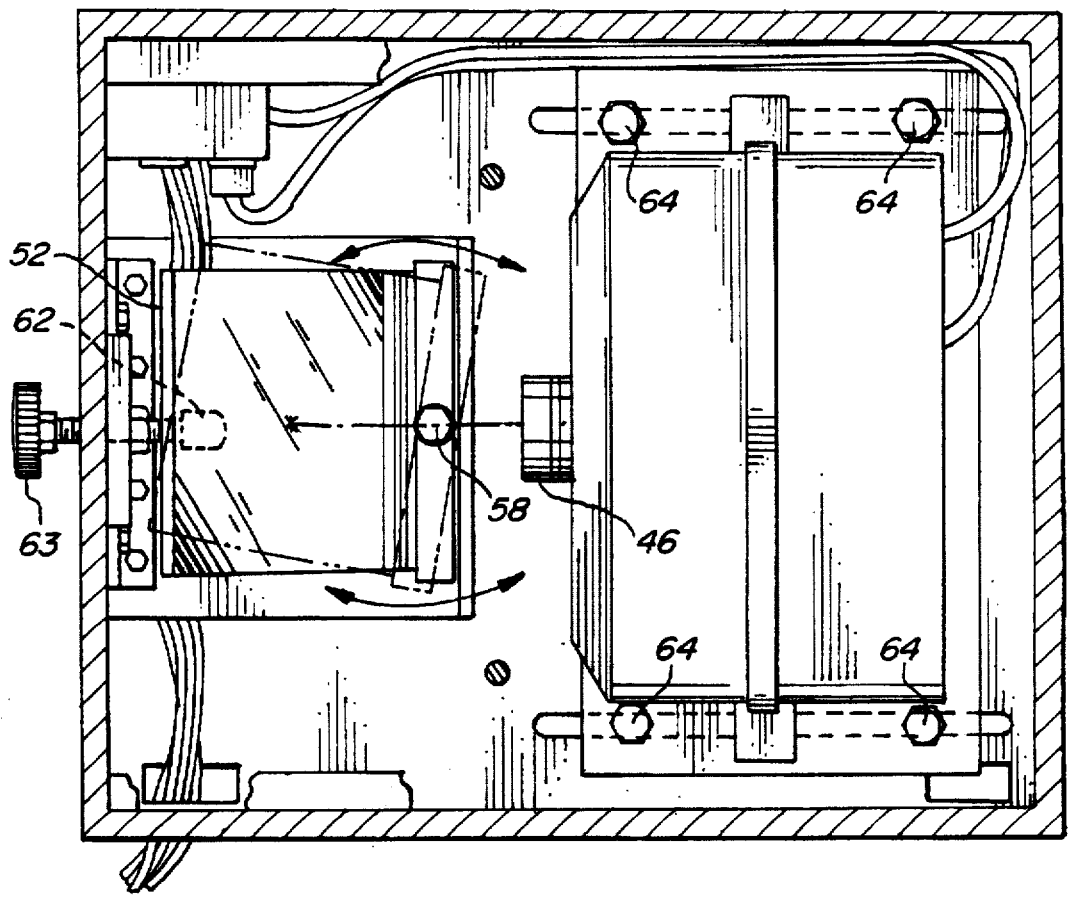
FIG. 4 is a plan view of the interactive display shown in FIG. 3 taken along the line 4—4 therein.

With reference to FIGS. 2–4 the interactive display includes a touch position sensor 34 mounted below the upper surface 36 of the base housing 26. The pedestal 24 is mounted on the touch position sensor so that physical contact by a person with a touch area 28 causes the production of touch signals indicative of the location of the touched area.

The touch position sensor 34 is a device such as made by the Microtouch Systems,Inc. of Methuen, Mass. under the name the Visage Touchmate, a trademark of the Visage, Inc. The touch position sensor 34 operates by sensing a person's direct light touch on the screen 22 and producing from that contact a signal indicative of where on the screen that touch occurred. It is only required for the screen 22 and pedestal 24 to be balanced on the touch position sensor 34 and to initially undertake a calibration of this arrangement in accordance with available published instructions. The output touch signals from the sensor 34 are applied to a control 38 located externally of the base housing. Since the touch sensor 34 is quite sensitive, a connecting cable such as 40 is carefully routed and fixed in position so as to enable the calibration step to take the effect of the cable 40 into account and avoid its influencing the sensor output.

Control 38 includes appropriate microprocessor capability to receive the touch signals and convert these to frame number signals for output to a high quality video play back device 42 such as a laser disk player or VCR or a digital video play back device. Since the frame numbers relate to a particular video play back program the control 38 preferably is provided with a replaceable EPROM 44 stored with data associated with a particular video program to convert the touch signals to frame number signals. The control 38, therefore, includes sufficient CPU capability for handling the input signals from the touch position sensor 34 and communicate with the video play back device (VPBD) 42.

The control 38 and the video playback device 42 are preferably located externally of the base housing 26. This enables one to set up different programs for display without having to cause a readjustment of the calibration of the touch position sensor 34. A set of cables 40.1 and 40.2 respectively interconnect the externally located control 38 and video playback device 42 with the touch position sensor 34 and an optical projector 46. The cables needed between the control 38 and the video playback device 42 has been deleted for clarity.

The frame signals from the video playback device 42 are applied to a projector 50 of conventional design and selected to produce the optical beam 30 in response to electronic video signals from the video playback device. The projector 46 is aligned horizontally inside the base housing 26 so as to direct its output beam 30 onto an adjustable mirror 52. The mirror 52 is oriented to reflect the optical beam 30 upwardly through an optical opening 53 in the upper surface 55 of the base housing 26 onto the rear surface 32 of the screen 22. The optical opening 53 preferably is covered by an optically transparent cover 57.

The mirror 52 is rectangular and has a lower edge 54 pivotally mounted on a bracket 56. Bracket 56 in turn is pivotally affixed to the bottom wall 58 of base housing 26 with a pivot 58 whose rotational axis 60 is vertical for adjustments in the manner as illustrated in the view of FIG. 4. The back of the mirror 52 rests on an adjustable threaded support 62 with which the vertical reflection angle alpha can be changed by rotating an attached control knob 63. The threaded support meshes with a suitable nut mounted to the base housing 26. With these adjustments the optical beam 30 can be properly centered on the rear projection surface 32.

A pair of adjustable screws 59 extend downwardly from the upper wall 55 of the base housing to stabilize the platform 61 on which the position touch sensor 34 is mounted. Wing nuts 61a are placed above and below the platform 61 to enable one to adjust and fix the tilt of the platform as this may be needed for appropriate incidence and placement of the beam 30 on the rear projection screen 22.

The projector 46 is horizontally adjustable to assure the proper focusing of the optical image on surface 32. The adjustment is made with the loosening of mounting screws 64.

The pedestal 24 freely extends through a second opening 66 in the upper wall 55 of the base housing 26 and is inclined relative to the vertical so that the optical beam can strike the rear projection surface 32 at a right angle or close to that. The combined effect of the inclination of the pedestal and the rear projection screen 22 combine to provide a convenient surface for interaction with persons. The height of the pedestal is, therefore, in addition to the need for a desired focal length, selected to facilitate a person's contact with the screen during interaction with the program played back from the playback device 42.

Operation of interactive display system 20 is similar to that described in the previously identified copending patent application. The playback device commences, when there is no contact made with the screen 22 to display an attract mode. This can be a single frame or a repeatable sequence both of which could, for example, request a passerby to touch the screen. As soon as a person does so by touching the screen at any place, a main menu is displayed on the screen 22. Further operation involves the person contacting particular areas on the screen followed by responses in the form of a display of a program played back by the playback device.

Having thus described an embodiment for an interactive display system in accordance with the invention its advantages can be appreciated. Other forms and shapes of the system may be implemented by one skilled in the art without departing from the scope of the claims as set forth herein.

What is claimed is:

1. In an interactive display system having an electronic scale to generate touch signals representative of the occurrence and location of a person's touch of a display screen mounted on the touch position sensor and wherein a playback device produces video signals for display on the display screen in response to the touch signals, the improvement comprising:

a housing having an optical opening, with said touch position sensor being mounted to said housing;

projection means, mounted to the housing, and responsive to the video signals for producing an optical beam representative of the video signals, with the optical beam directed to extend upwardly through the optical opening in the housing;

a pedestal mounted on the touch position sensor and extending upwardly therefrom;

a rear projection screen having a rear and front surface; said rear projection screen being mounted on the pedestal with said rear surface thereof in the path of said upwardly directed optical beam emanating from the housing opening, and with the pedestal height selected to enable a person to touch said front surface to cause the generation of said touch signals from the touch position sensor.

2. The interactive display as claimed in claim 1 wherein said rear projection screen is affixed to an upper end of said pedestal and extends over said housing.

3. The interactive display as claimed in claim 1 wherein said touch position sensor is mounted inside said housing, and wherein said housing has a second opening in an upper wall thereof, and with said pedestal freely extending through said second opening.

4. The interactive display as claimed in claim 3 wherein said first and second openings are located in said upper wall of the housing.

5. The interactive display as claimed in claim 1 wherein said rear projection screen is essentially planar and is inclined relative to the horizontal.

6. The interactive display as claimed in claim 1 wherein said projection means includes a projector oriented to produce said optical beam in a generally horizontal direction, reflector means interposed with said horizontally directed optical beam to reflect the optical beam upwardly through said first housing opening onto said rear surface of the rear projection screen.

7. The interactive display as claimed in claim 6 wherein said reflector means is adjustably mounted.

\* \* \* \* \*